United States Patent [19]

Knepper et al.

[11] Patent Number: 4,605,218
[45] Date of Patent: Aug. 12, 1986

[54] CONSTANT FORCE ROLL ASSEMBLY

[75] Inventors: James A. Knepper, Longmont; Leroy Rose, Boulder, both of Colo.

[73] Assignee: International Business Machines Corporation, Armonk, N.Y.

[21] Appl. No.: 545,728

[22] Filed: Oct. 26, 1983

[51] Int. Cl.$^4$ .............................................. B65H 9/16
[52] U.S. Cl. ................................. 271/238; 271/251; 271/274; 267/177
[58] Field of Search ............... 271/273, 272, 314, 251, 271/122, 125, 274; 226/187, 177, 176; 267/177

[56] References Cited

U.S. PATENT DOCUMENTS

| | | | |
|---|---|---|---|
| 973,641 | 10/1910 | Dysart | 267/177 |
| 1,788,373 | 1/1931 | Anderson | 267/74 |
| 3,021,134 | 2/1962 | Appell | 271/274 |
| 3,067,999 | 12/1962 | Skeen | 271/274 |
| 3,072,397 | 1/1963 | Kelchner | 271/274 |
| 3,155,109 | 11/1964 | Anthon | 137/408 |
| 3,351,255 | 11/1967 | Gorawski et al. | 226/187 |
| 4,052,054 | 10/1977 | Cardwell et al. | 271/227 |
| 4,074,902 | 2/1978 | Bradbury | 271/125 |
| 4,112,960 | 9/1978 | Hermanns | 137/85 |
| 4,279,413 | 7/1981 | Siwik et al. | 271/274 |

FOREIGN PATENT DOCUMENTS 0039254 3/1977 Japan ............................ 271/274

Primary Examiner—Bruce H. Stoner, Jr.
Assistant Examiner—Alvin Oberley
Attorney, Agent, or Firm—Charles E. Rohrer

[57] ABSTRACT

A mounting mechanism for the backup roll of a roll pair wherein a four bar linkage is provided. The backup roll is mounted at one end of a first arm and bears against a mating roll positioned in a stationary location. The first arm extends to a pivot point around which the backup roll rotates to engage the mating roll. A second arm is rigidly connected to the first arm at the pivot point and extends to an end point. A third arm, comprised of a coil spring with a coupler threaded thereto, extends from the end point of the second arm to a stationary point. The fourth arm of the four bar linkage is the ground extending between the stationary points to which the first and third arms are attached. By adjusting the coupler, the number of active coils in the third arm is adjusted thereby adjusting the normal force between rolls to a desired value. By providing the first arm with substantially more length than the second arm, the normal force between rolls is maintained relatively constant over a wide tolerance in the stationary location of the mating roll.

2 Claims, 4 Drawing Figures

CONSTANT FORCE ROLL ASSEMBLY

This invention relates to paper feed devices and more particularly relates to a mounting mechanism capable of maintaining relatively constant normal force between paper feed rolls despite variations in roll position.

BACKGROUND OF THE INVENTION

Many types of paper processing machines such as convenience copiers, printers, and the like, utilize paper feeding devices to move documents to a processing station. Machine operators may feed documents by inserting them one at a time into a feeding mechanism or may place a stack of documents upon a feed tray from which they are automatically fed. Blank sheets to be printed are generally fed to a print receiving station from a stack of sheets.

U.S. Pat. No. 4,052,054 describes a semiautomatic document feed device (SADF) for a convenience copier. In that device, the operator inserts a document to be copied into a pair of aligner rolls positioned near the front of the machine. Those rolls take the document from the operator's hand and move it forward to register the leading edge of the document against an entry gate. While moving the document forward, the aligner rolls simultaneously move the document sideways to a reference edge near the front of the machine so that when the document reaches the entry gate the side edge of the document is also in proper position. In the SADF shown in the above-mentioned patent, a second set of aligner rolls are provided near the rear of the machine such that the leading edge of a second document to be copied can be positioned at the entry gate in side-by-side relationship with a first document. As the second set of aligner rolls operate, the second document is side-edge referenced against a reference edge at the rear of the machine. When the entry gate drops, the aligner rolls are restarted to feed the two sheets to the processing station simultaneously.

In the operation of the device described in the above-named patent, it is sometimes desired to copy a wide sheet of paper, for example, a computer printout sheet, which comes under the influence of both the front aligner rolls and the rear aligner rolls. Since the front aligner rolls attempt to move the side edge of the sheet toward a front reference edge and the rear aligner rolls attempt to move the sheet toward a rear reference edge, the two sets of aligner rolls tend to move the sheet to be copied in opposite directions. In the device described in the above-mentioned patent, it is desired to move the sheet toward the front reference edge for proper positioning, and therefore a slightly higher normal force must be exerted between the aligner rolls at the front than is exerted between the aligner rolls at the rear. By so doing, the large sheet is caused to slip in the nip of the rear aligner rolls and is moved to the front reference edge.

Another problem faced by the SADF of the above-mentioned patent is that the normal force produced between the aligner rolls cannot be too great since the rolls feed the leading edge of the paper against the entry gate. If the force is too high, the paper may buckle or may be damaged. To prevent that result, the normal force between the aligner rolls must be low enough to allow the paper to slip between the rolls when the leading edge reaches the entry gate.

The normal force between aligner rolls cannot be too low, however, since too low a force would cause the paper to slip prior to the time it reaches the entry gate and create a situation in which the paper may not be properly registered at the entry gate.

It has been found that the normal force produced between the aligner rolls must be between 20 and 30 grams in order to drive the paper properly. Within that narrow range of force, the normal force between the front aligner rolls must be greater than the normal force between rear aligner rolls. It is desired, therefore, to produce a front aligner roll nominal force of 27½ grams with a tolerance of ±2 grams and a nominal rear aligner roll force of 22½ grams with a tolerance of ±2 grams. When one considers that the weight of a standard paper clip is about one gram, one can appreciate the sensitive force adjustment needed to hold within the small tolerance levels necessary for the proper operation of the device.

In a roll-mounting device which makes use of a spring to set the required force between rolls, most commercially available springs carry about ±10% tolerance in the spring rate. If one desires a ±2 gram tolerance in a force of 22½ grams, it is apparent that the entire tolerance figure for the mounting mechanism is more than consumed by the tolerance in spring rate. Since tolerances must exist in the mechanism itself and in the rolls, the problem is compounded. One should also note that a 10% tolerance in spring rate results in greater than 10% variation in deflection.

In the particular paper moving aligner rolls used in the above-named patent, another problem is the displacement tolerance provided by the nominal positioning of the aligner rolls. Note that one of the aligner rolls is mounted in a movable cover, thus the position of this roll is not determined until the cover is closed. One may appreciate that a significant tolerance must be provided in the positioning of this roll from machine to machine to accommodate the nature of a pivoting cover. In such an environment, it is essential to provide a roll mounting mechanism which is capable of adjusting to a nominal spring rate and capable of providing a relatively constant normal force over a relatively wide deflection range. Additionally, as outlined above, the roll mounting mechanism must achieve these results despite the presence of accumulated tolerances in the roll mounting mechanism itself as well as tolerances in the spring rate.

The object of this invention, therefore, is to provide a mechanism for mounting a backup roll to mate with a drive roll such that a relatively constant normal force is provided between rolls over a wide deflection range.

SUMMARY OF THE INVENTION

This invention provides a four-bar linkage for mounting the backup roll of a roll pair. One bar of the linkage is comprised of a coil spring into which a coupler is threaded. The coil spring and the coupler provide one arm of the four-bar linkage and exert a force on a second bar which leads from one end of the coil spring arm to a pivot point. A third bar of the linkage runs from the pivot point to the backup roll shaft and the fourth bar is the ground plane represented by the drive roll against which the backup roll is positioned, and the ground plane to which the other end of the spring arm is connected. With this arrangement, a moment arm is created around the pivot point such that a force is exerted through the backup roll on the mating drive roll. By adjusting the coupler, the desired nominal force is obtained and in the unique design of the mounting arrangement, the nominal force remains relatively constant over a wide tolerance band in the positioning of the drive roll.

BRIEF DESCRIPTION OF THE DRAWING

The above-mentioned and other features and objects of this invention and the manner of attaining them will become more apparent and the invention itself will best be understood by reference to the following description of embodiments of the invention taken in conjunction with the accompanying drawing, the description of which follows.

DETAILED DESCRIPTION

Figure 1:
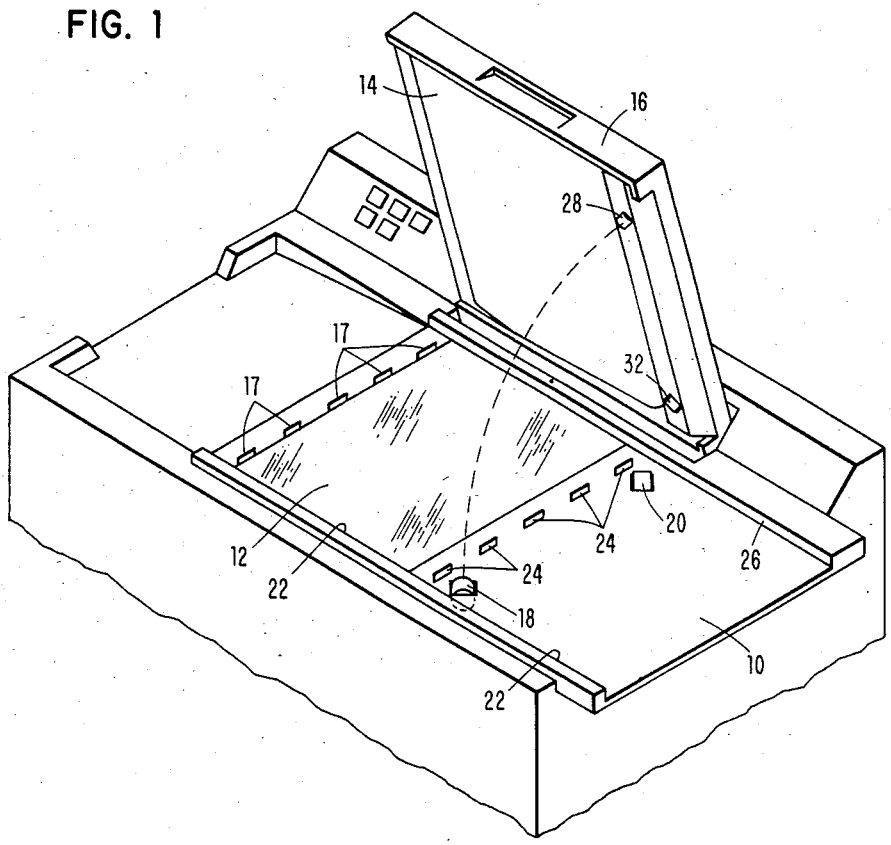
FIG. 1 shows a semiautomatic document feed device in which front and rear aligner rolls are used. The aligner rolls require sensitive force adjustment and the roll mounting mechanism of the instant invention is advantageously used.

FIG. 1 is a view which corresponds to FIG. 1 of the above-mentioned patent. It is a perspective view of a convenience copier which can make advantageous use of the instant invention. A processing station comprised of a document glass 12 receives a document to be copied. Proper positioning of the document requires the leading edge to be placed against an exit gate 17 and the side of the document against reference edge 22. To move documents into position to be copied, the operator places a document on the entry tray 10 such that the leading edge is moved to the left by the aligner rolls 28 and 18. Simultaneously, the side of the document is moved toward the front of the machine against a front reference edge 22 such that when the document reaches entry gate 24, the document is referenced against edge 22. When entry gate 24 is dropped, the aligner rolls feed the document onto the document glass where it comes under the influence of document feed belt 14. Feed belt 14 moves the document into processing position with the leading edge at the gate 17 and the side edge against front reference edge 22.

If two documents are to be copied simultaneously, a second document is inserted by hand near the rear reference edge 26 until it comes under the influence of the rear aligner roll pair, rolls 20 and 32. These rolls move the leading edge of the document to the entry gate 24 and simultaneously move the side of the document toward rear reference edge 26. With documents present at both the front and rear reference edges, when the entry gate 24 is dropped, the two documents are fed simultaneously onto the document glass 12 and into registration with the gate 17. The side edge of the front document is positioned against reference edge 22 and the side edge of the rear document is positioned against reference edge 26. Machine control to set the optical system at proper reduction for two sheet copying and for moving the documents onto the document glass at the proper time are described in the above-named patent and in manuals published for the IBM Series III Model 60 Copier/Duplicator. Since these controls do not form a part of this invention, they need not be described herein.

FIG. 1 shows the document cover 16 in opened position to illustrate the mounting of rolls 28 and 32 in the movable cover 16. In some arrangements, these rolls may be drive rolls and in other arrangements, these rolls may be the backup rolls. When cover 16 is closed, these rolls bear against the mating rolls 18 and 20. In any event, because of the presence of rolls in the movable cover and because of difficulty in holding the exact position of these rolls from machine to machine, variations in the exact positioning of the roll nip with the cover closed from machine to machine are unavoidable. Consequently, an arrangement for the backup roll must be provided such that it provides a required normal force against the mating roll regardless of variations in the exact positioning of the nip.

Figure 2:
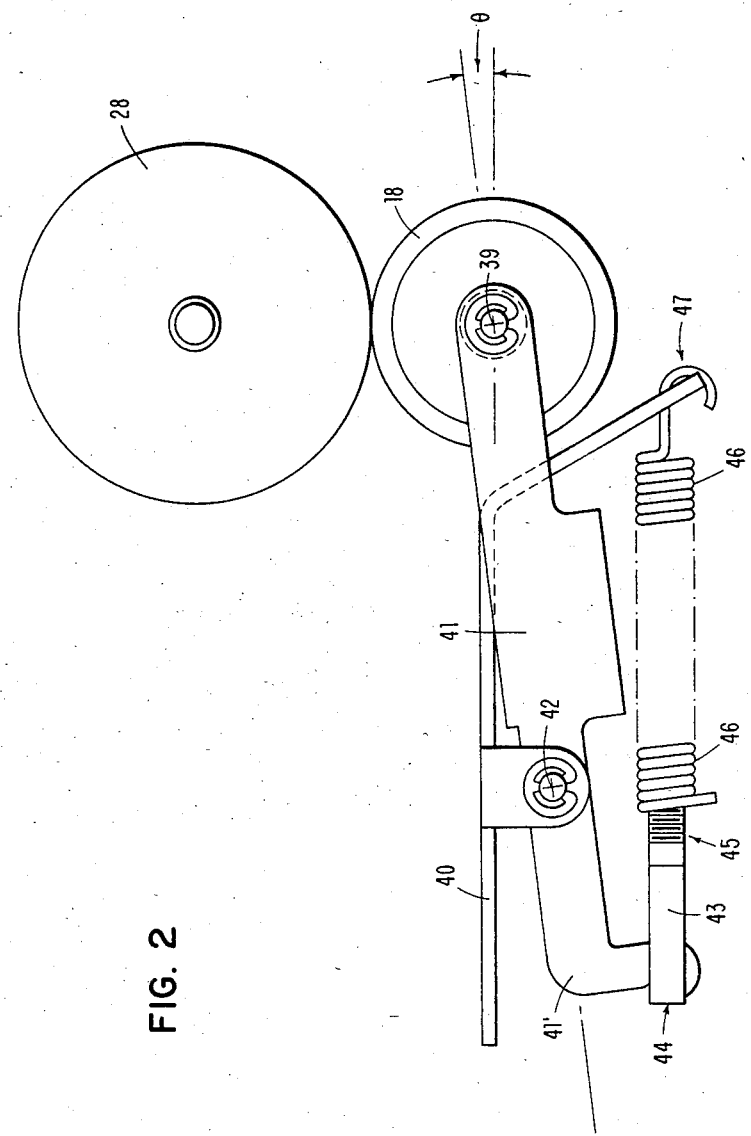
FIG. 2 shows the mounting mechanism of this invention for the backup roll of a roll pair.

FIG. 2 shows a mounting mechanism for the backup roll capable of doing the required job. Backup roll 18 is mounted at an end point 39 of arm 41 and forms a roll nip with mating drive roll 28. Arm 41 is pivoted at pivot point 42 and is considered to end at that point. Arm 41' extends from pivot point 42 to an end point 44. Coupler 43 is connected at end point 44 to the arm 41' and contains a threaded portion 45 which is screwed into one end of spring 46. The opposite end of spring 46 is connected to bracket 40 at end point 47. Bracket 40 is stationary thus providing a ground plane to which end point 47 is attached. Note that backup roll 18 bears against drive roll 28 (which acts as a ground point) and by virtue of the action of spring 46 provides a force against roll 28.

The mounting mechanism for backup roll 18 shown in FIG. 2 is capable of providing a relatively constant normal force against drive roll 28 over a relatively wide range in the vertical positioning of the roll nip. That is, when drive roll 28 is brought against backup roll 18 by the closing of cover 16 (FIG. 1), the exact position of the nip between the two rolls can vary from machine to machine. Despite that variation, the required force between the two rolls is relatively constant because of the unique geometry of the mounting mechanism. One may observe from FIG. 2 that if roll 28 were positioned below the level shown in FIG. 2, (angle $\theta$ decreases) spring 46 would be stretched to a greater degree and therefore provide a higher force bearing on the end point 44. Despite the increase in the force exerted by spring 46, the output normal force of backup roll 18 remains relatively constant. This result is obtained since, as the angle $\theta$ decreases ($\theta$ is the angle of deflection), the length of the moment arm through which spring 46 acts around pivot point 42 also decreases. As a result, the moment remains relatively constant even though spring force increases. Since the sum of the moments at static equilibrium around the pivot point 42 equals zero and since the geometry is such that the moment arm of backup roll 18 (generally along arm 41) is much longer than the opposing moment arm for spring 46, the changes in the angle $\theta$ have a significantly lowered effect on the length of the moment arm of the backup roll. As a result, the force exerted by the backup roll 18 on the mating roll 28 remains relatively constant. The result of the application of this geometry to the front aligner rolls is illustrated in FIG. 3.

Figure 3:
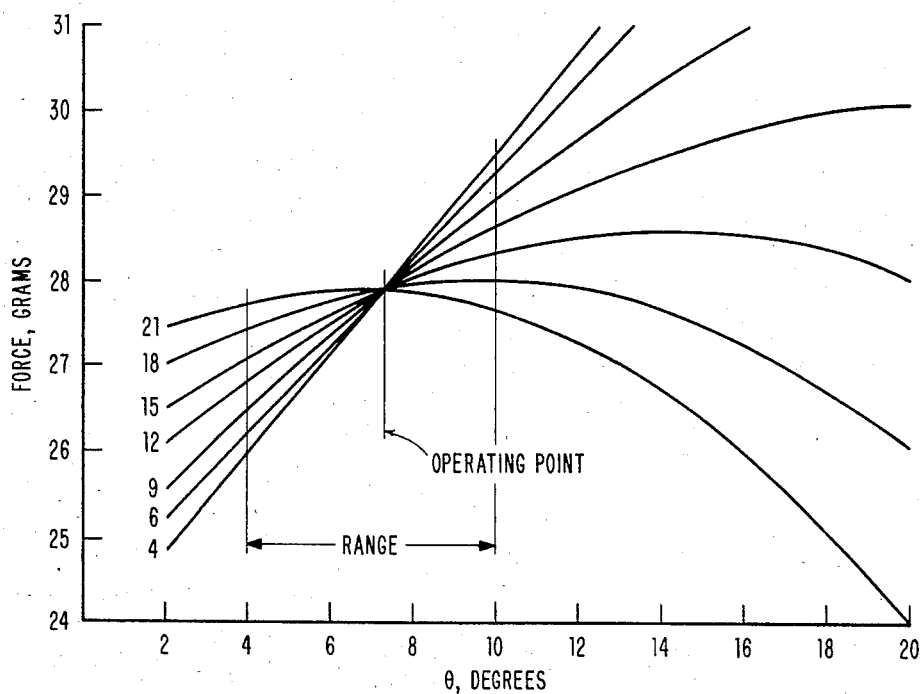
FIG. 3 is a force versus displacement diagram for various spring rates at the front aligner rolls shown in FIG. 1 with the mounting mechanism shown in FIG. 2.

FIG. 3 shows a family of curves for various spring rates and illustrates a desired operating range where $\theta$ varies from 4°–10°. The figure shows that a spring rate ($K_s$) of 21 provides a relatively constant force throughout the operating range. Note that the nominal force provided with a spring rate of 21 is approximately 27.8 grams at a deflection of 7° while at 4° the force is about 27.75 grams and at 10° it is about 27.7 grams. Thus, a spring with the spring rate of 21 provides a normal force ranging only about 0.1 grams from the nominal force over a deflection angle of 6°. This result is achieved despite tolerance variations in the spring rate (compensated for by the coupler 43) and despite accumulated tolerances in the mounting mechanism. The key considerations in obtaining this result are the provision of an arm 41 considerably longer than arm 41' and the use of threaded coupler 43 which alters the number of active coils in spring 46.

Figure 4:
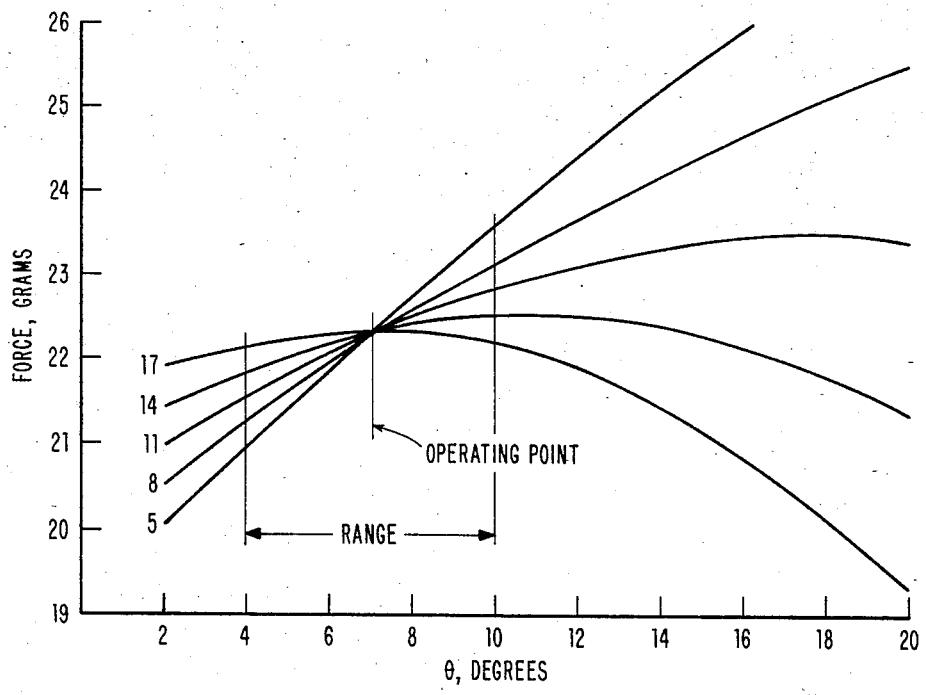
FIG. 4 is like FIG. 3 but shows a force/displacement diagram for the rear aligner rolls.

FIG. 4 illustrates a family of curves for the rear aligner rolls utilizing the mounting arrangement shown in FIG. 2. In FIG. 4, note that with a spring rate of 17, a nominal force of about 22.3 grams is provided at a deflection of 7°. At a deflection of 4°, the force is about 22.15 grams and at 10° deflection, the force is about 22.2 grams. Thus, the normal force between the rear aligner rolls ranges only about 0.15 grams over a deflection of 6°.

FIGS. 3 and 4 show that the unusually severe force requirements found in the SADF of FIG. 1 are met by the mounting mechanism of FIG. 2. As a practical matter, however, whatever device is chosen to meet the force requirements, it should also be economical, easy to adjust, once adjusted it should maintain its adjustment, and it should require no fine tuning from machine to machine. One will appreciate that the mechanism of FIG. 2 utilizes standard components. It can be adjusted easily by use of the coupler, once adjusted the coupler does not change position, and the device has been purposely designed to require no fine tuning despite variations in roll position from machine to machine.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A convenience copier machine wherein said machine includes:
   a document platen;
   a cover for said document platen;
   an entry tray means across which a document to be copied is fed to said document platen;
   aligner roll means to position said document to be copied, said aligner roll means comprised of a first aligner roll mounted near said entry tray and a second aligner roll mounted in said document cover, the two rolls capable of mating with one another to establish an aligner roll nip for feeding said document to said document platen;
   mounting means for mounting one of the aligner rolls such that it assumes a stationary position, said nip established within an angular displacement tolerance of six degrees;
   mounting means for the other roll for establishing a nominal normal force at said nip at a selected force level in the range of 20 to 30 grams, said mounting means maintaining said selected force level over said angular displacement tolerance to within ten percent of said selected level;
   a first reference edge along one side of said document platen and wherein said aligner roll means is positioned near said first reference edge to move one side of said document to be copied into sliding engagement therewith;
   a second reference edge parallel to said first reference edge and positioned along an opposite side of said document platen;
   a second aligner roll means positioned near said second reference edge to move one side of a document to be copied into sliding engagement with said second reference edge;
   said second aligner roll means including a third roll mounted near said entry tray and being positioned at a stationary location within an angular displacement tolerance range of six degrees;
   a fourth roll bearing against said third roll when it is at said stationary location for providing a nip therebetween;
   mounting means for said fourth roll for establishing a nominal normal force at said nip at a selected force level in the range of 20 to 30 grams, said mounting means maintaining said selected force level over said angular displacement tolerance to within ten percent of said selected level; and
   said selected force level for said second aligner roll means being established within said range at least twenty percent below the force level established for said first aligner roll means.

2. The machine of claim 1 wherein said mounting means for said second roll and said mounting means for said fourth roll take the same mechanical configuration which is comprised of:
   a first arm with said second or fourth aligner roll mounted at an end thereof, said first arm extending to a pivot point around which the second or fourth aligner roll rotates into engagement with the respective mating roll;
   a second arm comprised of a rigid extension of said first arm and substantially shorter than said first arm, extending from said pivot point to an end point; and
   a third arm extending from said end point to a stationary point, said third arm comprised of a coil spring and a coupler means threaded into said spring for adjusting the number of active coils therein.

* * * * *